J. HASELTINE.

WATER-WHEEL.

No. 6,873.

Reissued Jan. 25, 1876.

Witnesses.

J. Russell Reed

Thos. C. Espenmore

Inventor

John Haseltine

N. PETERS, PHOTO-LITHOGRAPHER, WASHINGTON, D. C.

UNITED STATES PATENT OFFICE.

JOHN HASELTINE, OF MELROSE, MASSACHUSETTS.

IMPROVEMENT IN WATER-WHEELS.

Specification forming part of Letters Patent No. 14,535, dated March 25, 1856; extended seven years; reissue No. 6,873, dated January 25, 1876; application filed December 23, 1875.

*To all whom it may concern:*

Be it known that I, JOHN HASELTINE, of Melrose, in the county of Middlesex and Commonwealth of Massachusetts, have invented a new and useful Water-Wheel, and combined the same with a case or guide so as to operate in a new manner, which inventions are fully set forth in the following specification, reference being had to the accompanying drawings, of which—

Figure 1:
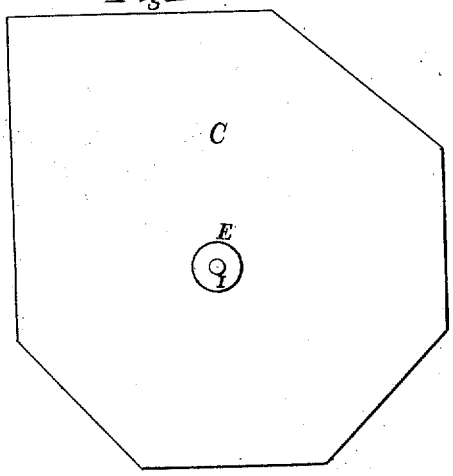
Figure 2:
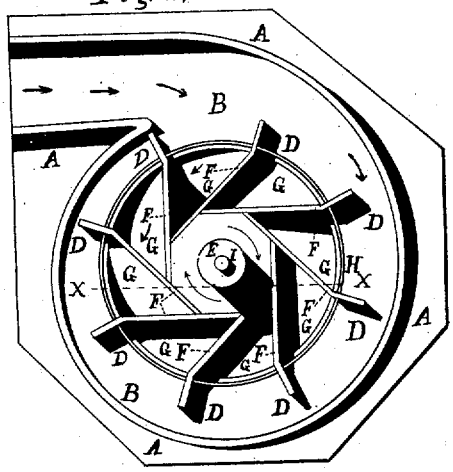
Figure 3:
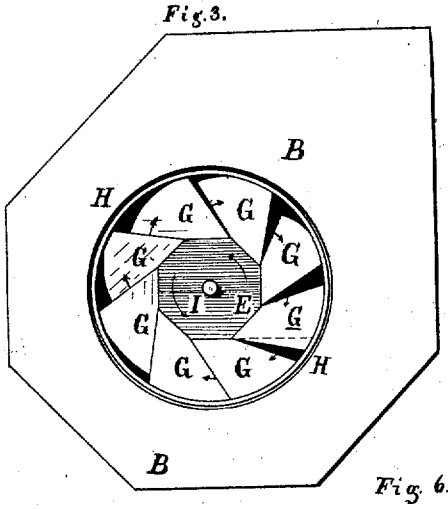
Figure 4:
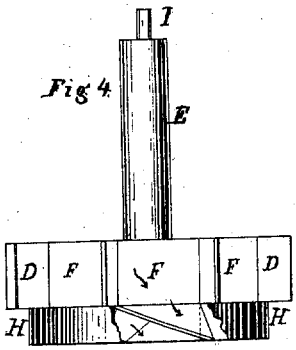
Figure 5:
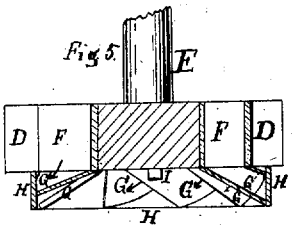
Figure 6:
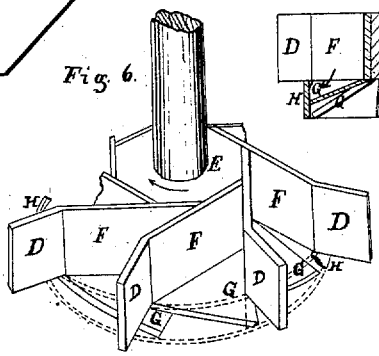

Figure 1 is a top view of my wheel in a scroll case or guide, with the cover on, which conducts the water to the entire periphery of the wheel. Fig. 2 is a top view of my wheel in the scroll-case or guide, with the cover removed. Fig. 3 is a bottom view of my wheel in the scroll case or guide. Fig. 4 is a side view of my wheel out of the case, with a section of the hoop removed. Fig. 5 is a vertical sectional view of the wheel out of its case, on the line *x x*. Fig. 6 is a view in perspective of the shaft, with four floats attached.

My invention consists in making the outer portion of the float, upon which the water acts first, radial; the next portion, which receives the action of the water, tangential; and the lower portion, upon which the water acts by its head, to incline downward from the shaft or center of the wheel, and from the tangential portion of the floats; and in combining the same with a case in a novel manner.

A A A A are the sides, and B is the bottom, of a scroll, and C is a cover which fits closely on top of these sides, the shaft of the wheel passing through the aperture in it and filling it substantially. These parts A, B, and C constitute a case in which the wheel runs, and by which the wheel is supplied with water. It is made so deep as just to allow the radial and perpendicular portion D of the floats to turn freely in it, while it gradually diminishes in width to its termination.

A series of floats projects from the shaft of the wheel at equal intervals all around it.

The radial portion D of the float may be connected to the shaft E of the wheel by the tangential portion F of the float, and this tangential portion is made perpendicular to or parallel with the shaft, as represented, and stands upon a tangent to a circle drawn with the axis of the shaft for its center.

The inclined portion G of the float is joined to the lower edge of the tangential portion F, so as to incline downward from the tangential portion to its edge, and from its inmost extremity to its periphery, or where it joins the rim or hoop H of the wheel, which rim or hoop surrounds the extremities of the inclined portions G of the floats, and is preferably joined to them.

The shaft E is provided with pivots I I, which may be fitted to turn in appropriate boxes fitted for them.

The floats above mentioned may be made of wood, or of wrought or cast iron, or the wheel may be cast whole, as preferred.

The water enters the case, as indicated by the arrows, Fig. 2, and acts on the radial portion D of the floats, and, as it is confined by the case or guide everywhere except where it enters the wheel, it necessarily turns toward the shaft of the wheel and acts on the tangential portions F of the floats, and, by its head, on the inclined portions G of the floats, which inclined portions are as nearly as may be concentrically opposite to their discharging-apertures—that is to say, so that a circle drawn in a horizontal plane about the center of the wheel, so as to pass through any point of a discharging-aperture, will also intersect the inclined surface next in front of it, from which the water flows through this aperture—from which the water tends to flow in the direction of the periphery of the wheel, the inclined portions being so arranged that the water has a tendency to flow or run toward the periphery of the wheel as it descends through it.

By the inclination of the floats from the periphery of the wheel upward to the interior extremities of the floats a cavity is formed within the wheel surrounded by the floats, as indicated more particularly in Figs. 3 and 5, and the water discharges in this cavity, and thence downwardly and outwardly, which it could not do were the rear edges of the inclined portions of the floats in a plane at right angles with the axis of the shaft, in which case the above-mentioned cavity would not be in the wheel.

It will be apparent that this inclination of the floats from the periphery of the wheel upward toward the interior of the wheel makes the length of each of the discharging-orifices greater than the distance horizontally from the shaft to the periphery of the wheel, which is a new and useful result in this species of wheel.

What I claim as my invention is—

1. A water-wheel having floats with radial, tangential, and inclined portions, constructed and arranged substantially as described.

2. A water-wheel having floats with the tangential and downwardly-inclined portions so arranged that the discharging-orifices are concentrically opposite the inclined portions, in a case or guide and rim, all so constructed that the head of water always presses equally on all the floats at once, substantially as described.

3. A water-wheel surrounded by a rim above which the water enters the wheel, having floats the lower portions of which are so inclined downward toward the periphery of the wheel that the water shall tend to flow toward the periphery of the wheel, substantially as described.

4. A water-wheel, with its guide or case substantially as described, having floats inclined upward from its rim toward their interior extremities, so as to permit lengthening the discharging-apertures and forming a cavity within the wheel, substantially as described.

JOHN HASELTINE.

Witnesses:

J. RUSSELL REED,

THOS. L. LIVERMORE.